C. K. SALISBURY.
SPRING FOR CENTRIFUGAL SEPARATOR BEARINGS.
APPLICATION FILED APR. 6, 1912.

1,158,726.  
Patented Nov. 2, 1915.

WITNESSES.  
Arthur F. Mutter.  
Katherine Holt.

INVENTOR  
Charles K. Salisbury.  
By Morsell & Caldwell.  
ATTORNEYS

UNITED STATES PATENT OFFICE.

CHARLES K. SALISBURY, OF MILWAUKEE, WISCONSIN, ASSIGNOR TO STANDARD SEPARATOR COMPANY, OF MILWAUKEE, WISCONSIN, A CORPORATION OF NEW JERSEY.

SPRING FOR CENTRIFUGAL-SEPARATOR BEARINGS.

1,158,726.    Specification of Letters Patent.    Patented Nov. 2, 1915.

Application filed April 6, 1912. Serial No. 688,871.

*To all whom it may concern:*

Be it known that I, CHARLES K. SALISBURY, a citizen of the United States and resident of Milwaukee, in the county of Milwaukee and State of Wisconsin, have invented new and useful Improvements in Springs for Centrifugal-Separator Bearings, of which the following is a description, reference being had to the accompanying drawings, which are a part of this specification.

This invention relates to springs for the upper bearing of centrifugal separators, the spring being positioned between the bearing member and the frame to permit of oscillations or gyrations of the separator spindle in the bringing of the separator bowl to the proper speed. Various forms of spring means have been applied to this purpose and it is the object of the present invention to provide one which will be inexpensive to manufacture and will be efficient in use.

With the above and other objects in view the invention consists in the spring for separator bearings as herein claimed and all equivalents.

Figure 1:
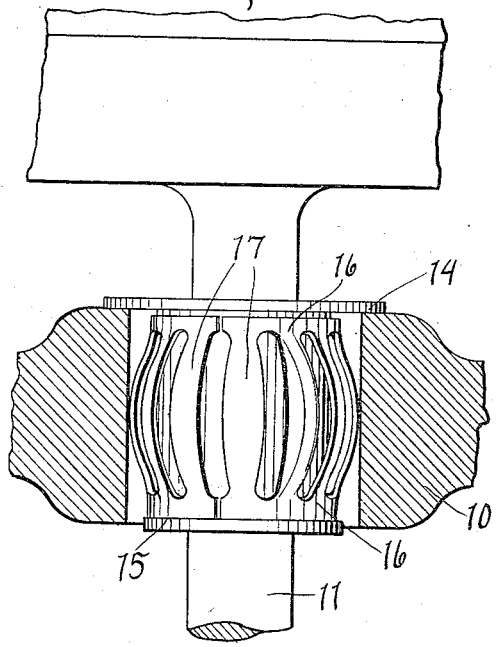
Figure 2:
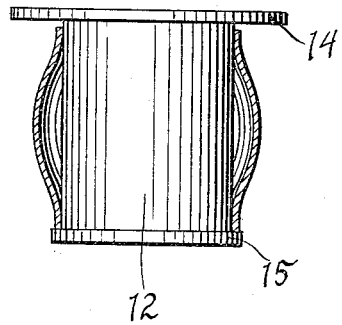
Figure 3:
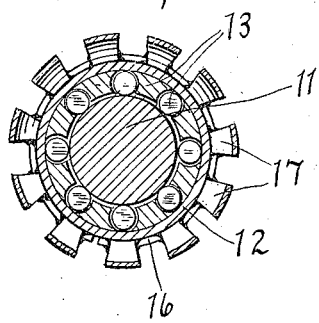
Figure 4:
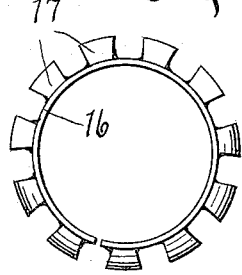

Referring to the accompanying drawings in which like characters of reference indicate the same parts in the different views: Figure 1 is a side elevation of a spring for a separator bearing constructed in accordance with this invention and shown as applied in use; Fig. 2 is a longitudinal sectional view thereof in place on the bearing sleeve; Fig. 3 is a transverse sectional view thereof; and, Fig. 4 is a plan view of the spring alone.

In these drawings 10 indicates a portion of the separator frame which is stationary and affords the opening containing the upper bearing for the spindle 11 of the separator bowl. This bearing consists of a sleeve 12 containing a roller bearing 13 for the spindle 11 and provided with an upper flange 14 to rest upon the frame 10 and a lower flange 15 to support the spring constituting the subject matter of this invention. In accordance with this invention the spring is stamped from a single piece of spring metal and merely consists of a strip with a series of transverse parallel slots cut in it which slots terminate at a short distance from each edge of the strip so that when the strip is bent to a ring form the uncut margins thereof form split rings 16 connected by the narrow spring straps 17 which are left between the slots. These straps 17 are bowed outwardly so that the entire spring is given a somewhat globular shape and while the top and bottom ring portions 16 left by the unslotted marginal portions of the strip fit upon the cylindrical surface of the bearing sleeve 12, the bowed central portion of the spring straps 17 bear against the walls of the opening of the frame as shown in Fig. 1. The lower ring portion 16 of the spring by engaging the lower flange 15 of the bearing sleeve keeps the spring in place.

In operation the bowed spring straps 17 connecting the top and bottom ring members of the spring may yield upon the tendency of the separator bowl to swing in any direction, but their spring action returns the bearing member to its normal central position at the end of such swinging tendency of the separator bowl and thus the bearing is centered though being free to yield when the movements of the separator bowl require it to do so.

What I claim as new and desire to secure by Letters Patent is:

1. A spring for separator bearings adapted for connection with a bearing sleeve having a top and bottom external flange, comprising a single strip of spring metal bent to form a split sleeve for surrounding the bearing sleeve and having parallel transverse slots formed therein terminating before reaching the edges of the strip to leave an unslotted marginal portion of the strip at its top and bottom for clasping with spring action around the bearing sleeve and the lower external unslotted marginal portion adapted to rest upon the lower flange of the bearing sleeve, said strip being bent or bowed to have the strips between the slots form a spherical spring.

2. A spring for separator bearings adapted for connection with a bearing sleeve, comprising a single strip of spring metal bent to form a split sleeve for surrounding the bearing sleeve and having approximately parallel transverse slots formed therein terminating before reaching the edges of the strip to leave an unslotted marginal portion of the strip at its top and bottom for clasping with spring action around the bearing sleeve, said strip being bent or bowed outwardly at its intermediate portion so that the connecting strips between the slots connecting the unslotted marginal portion at both ends of the device form bowed springs for engaging the stationary part of the separator bearing at their middle portion which springs are yieldingly restrained from straightening by the marginal portions of the device.

3. A spring for centrifugal separator spindles comprising a tubular sleeve having longitudinal slots extending from near one edge of the sleeve to near the other edge thereof, the strips of material between the slots being bowed outwardly.

In testimony whereof, I affix my signature, in presence of two witnesses.

CHARLES K. SALISBURY.

Witnesses:
KATHERINE HOLT,
CLARA MUEHLBACH.

Copies of this patent may be obtained for five cents each, by addressing the "Commissioner of Patents, Washington, D. C."